Patented Dec. 13, 1949

2,491,408

UNITED STATES PATENT OFFICE 2,491,408

PROCESS OF IMPROVING THE BAKING QUALITY OF FLOUR, ESPECIALLY WHEAT FLOUR

Hanns John, Deventer, Netherlands, assignor to Naamlooze Vennootschap Noury & van der Lande's Exploitatiemaatschappij, Deventer, Netherlands, a corporation of the Netherlands No Drawing. Application January 5, 1946, Serial No. 639,414. In the Netherlands November 26, 1940

Section 1, Public Law 690, August 8, 1946
Patent expires November 26, 1960

8 Claims. (Cl. 99—91)

The invention relates to the improvement of the baking strength of flour, especially wheat flour, or the production of a flour the baking strength of which has been improved, as compared with untreated flour, or ordinary flour. The invention also includes the production of a dough for bread-making which dough is equivalent to a dough produced by means of flour, the baking strength of which has been improved. Further the invention relates also to the treated flour, the baking strength of which has been improved by the method that constitutes one subject matter of the invention and to bread produced from such flour or from the dough the production of which constitutes one subject matter of the invention.

It has been known for many years that the baking quality of the flour of many cereals is entirely insufficient, which is particularly important in milling wheat or rye. The doughs prepared from such flour show a bad shape during fermentation, they flow out in breadth due to a strong proteolytic action, cannot be easily handled or worked up. The capacity of such dough to retain the fermentation gas is but low, which implies that the dough does not rise well before baking, shows a poor oven rise, hence the loaves remain small, the porosity of the bread is poor, the crumb is but little elastic with large pores and thick pore walls. These failures appear even with good varieties of American wheat, and with European inland wheat the preparation of a normal bread is almost impossible.

For some years several inorganic substances have been known which, if added to the flour in small amounts, are capable of improving these properties of the flour more or less. Some of these substances cannot be used because they are injurious to health as e. g. alum and copper sulphate. Other substances, mostly strong oxidants, are innocuous to health in the quantities employed though as inorganic products they remain foreign ingredients of flour and bread. Therefore, the addition of these substances has been disputed by numerous people. Any injury to health, however, could never be proved, while on the other hand the need for the improvers in the mill and in the bakery is extraordinarily great. The flour-improving substances most commonly employed are: bromates, persulphates, perborates and further the gases chlorine and nitrogen trichloride.

More recently it was proposed to improve the baking quality of flour by adding small amounts of ascorbic acid (vitamin C) against the use of which no objections can be raised from a hygienical point of view. Flour improving by means of this substance, however, is very expensive.

Now I have found, that the same improvement of the baking quality of flour can be obtained with organic substances selected from the vegetable kingdom, against which no hygienical objections can be made. So it is possible to improve the baking quality of flour in a very fine manner by reductic acid or the triketone formed from it by oxidation. These substances have, respectively, the following constitution formulas:

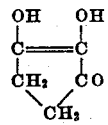   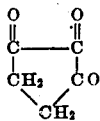

Reductic acid     Oxidation product of reductic acid, triketone

The reductic acid is reversibly oxidizable, which may explain that both the strongly reducing reductic acid, and also its oxidation product, show the same flour improving action. Already with 0.3 g. of these substances thoroughly mixed with 100 kg. of flour, a marked improvement is observed, while the optimum of the improvement, depending on the kind of flour, lies between 0.8 g. and 1.2 g. per 100 kg. of flour. To obtain the same improvement in baking quality, with the inorganic substances known, the following quantities must be used:

Potassium bromate, 1–4 g. per 100 kg. of flour
Ammonium persulphate, 5–20 g. per 100 kg. of flour
Chlorine, 5–20 g. per 100 kg. of flour The following baking tests give an idea of the improvement obtained over against that which may be reached with the flour improvers known.

| | Bread volume per 1000 g. of flour | Improvement in volume in per cent |
|---|---|---|
| | Cc. | |
| Flour without any addition | 5,243 | |
| Flour with 0.4 g. reductic acid per 100 kg | 6,577 | +25 |
| Flour with 0.8 g. reductic acid per 100 kg | 8,017 | +53 |
| Flour with 0.4 g. oxidation-product, triketone | 7,131 | +36 |
| Flour with 0.8 g. oxidation-product, triketone | 7,609 | +45 |
| Flour with 0.5 g. potassium-bromate | 5,700 | +9 |
| Flour with 2.25 g. potassium-bromate | 7,113 | +36 |

These tests were made with flour from a good Plata wheat (ash contents 0.55%). Also the following tests were made with flour from European home grown wheat, prepared with addition of 35% of rye and milled to a high grade (ash contents 0.90%). A good improvement was obtained:

| | Bread volume per 1000 g. of flour | Improvement in volume in per cent |
|---|---|---|
| | Cc. | |
| Flour without any addition | 4,600 | |
| Flour with 0.8 g. reductic acid per 100 kg | 5,243 | +14 |

The invention is not limited to the use of reductic acid or the triketone alone. Also salts, esters, ethers and other compounds of reductic acid or containing the triketone radical are active bread improvers. These substances, or one or more of them, will be hereinafter included in the term "a reductic acid substance."

What is claimed is:

1. A process of improving the baking quality of flour which comprises the addition to said flour of a small quantity of an improving agent containing a substance selected from the group consisting of reductic acid and the triketone which is the oxidation product of reductic acid.

2. A process as claimed in claim 1, in which the amount of such improving agent is between about 0.3 gram and about 1.2 grams per 100 kg. of said flour.

3. Flour for bread-making, which comprises flour normally deficient in bread-making quality containing an addition of a flour improving agent containing a substance selected from the group consisting of reductic acid and the triketone which is the oxidation product of reductic acid.

4. Product as claimed in claim 3, in which the amount of said improving agent is between about 0.3 gram and about 1.2 grams, per 100 kg. of said flour.

5. A process of improving the baking quality of flour which comprises the step of adding to the flour to be improved, a small quantity of reductic acid.

6. A process of improving the baking quality of flour which comprises the step of adding to the flour to be improved, a small quantity of the triketone which is the oxidation product of reductic acid.

7. As a new composition of matter, a mixture of flour which is normally deficient in breadmaking quality, and a small addition of reductic acid.

8. As a new composition of matter, a mixture of flour which is normally deficient in bread-making quality, and a small addition of the triketone which is the oxidation product of reductic acid.

HANNS JOHN.

REFERENCES CITED

The following references are of record in the file of this patent:

UNITED STATES PATENTS

| Number | Name | Date |
|---|---|---|
| 2,149,682 | Jorgensen | Mar. 7, 1939 |

FOREIGN PATENTS

| Number | Country | Date |
|---|---|---|
| 455,221 | Great Britain | Oct. 12, 1936 |
| 558,144 | Great Britain | Acc. Dec. 23, 1943 |
| 503,476 | Great Britain | Acc. Mar. 30, 1939 |

OTHER REFERENCES

Jorgensen: Biochemische Zeitschrift, Band 280 (1935), pp. 18 to 21 and 34 to 36.

Food Materials and Equipment (Article from Pishahevaya Prom. 1944, No. 56, 3–7), March 1946, p. 7.

Hawk et al.: Practical Physiological Chemistry, 12 ed. (1947), The Blakiston Co., p. 1134.

Elion: Cereal Chemistry, vol. XXI, #4, July 1944, pp. 314 to 319; pages 316, 317 relied on.

Hackh's Chemical Dictionary, 3 ed., The Blakiston Company, Philadelphia, 1944, p. 729.